Aug. 31, 1965    P. F. ALM    3,204,171
DIRECT CURRENT MOTOR
Filed Jan. 23, 1963    2 Sheets-Sheet 1

INVENTOR.
BY P. Folke Alm
Edmund A. F. Mourek
his ATTORNEY

Aug. 31, 1965　　　P. F. ALM　　　3,204,171
DIRECT CURRENT MOTOR
Filed Jan. 23, 1963　　　2 Sheets-Sheet 2

INVENTOR.
Per Folke Alm
BY
Edmund A. Fernander
his ATTORNEY

United States Patent Office

3,204,171
Patented Aug. 31, 1965

3,204,171
DIRECT CURRENT MOTOR
Per Folke Alm, Johanneshov, Sweden, assignor to Aktiebolaget Electrolux, Stockholm, Sweden, a corporation of Sweden
Filed Jan. 23, 1963, Ser. No. 253,433
Claims priority, application Sweden, Jan. 26, 1962, 869/62
5 Claims. (Cl. 318—379)

My invention relates to direct current motors.

Direct current motors of a type suitable for operating an automobile accessory, such as a windshield wiper, are known. In electric motors of this kind, in which a storage battery is employed as a direct current source of electrical supply, it has been the practice to provide a magnet frame having gaps bridged by permanent magnets which brake the armature when the motor is stopped. However, motors of this kind operate at constant speed and cannot be operated at different speeds, which is not satisfactory.

The object of my invention is to provide a direct current motor of the type indicated which can be rapidly braked and can be operated at different speeds. I accomplish this by providing a direct current motor having a stationary member including a magnet frame comprising a plurality of bodies extending end-to-end about the frame for carrying magnetic flux, adjacent ends of the bodies having gaps therebetween bridged by magnetic members of which at least one is an electromagnet.

My invention will be more fully set forth in the following description referring to the accompanying drawing, and the features of novelty which characterize my invention will be pointed out with particularity in the claims annexed to and forming a part of this specification.

Figure 1:
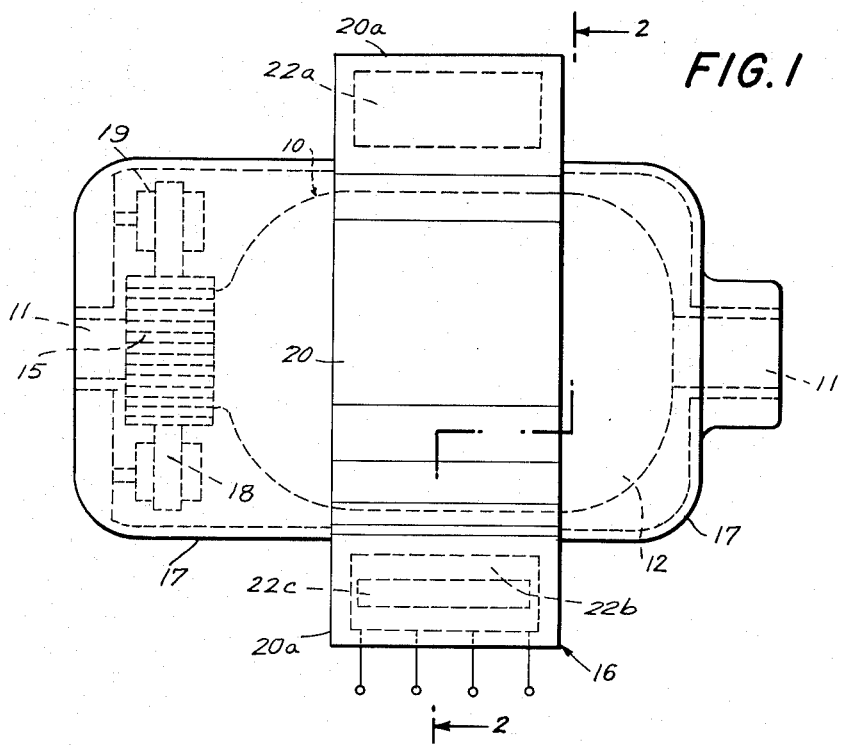
Figure 2:
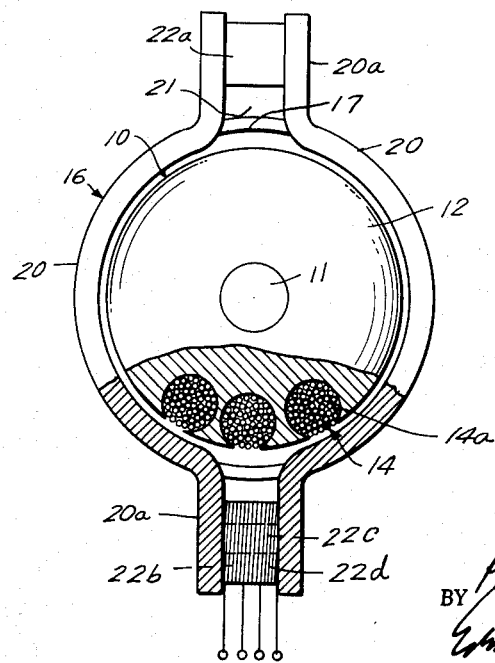
Figure 3:
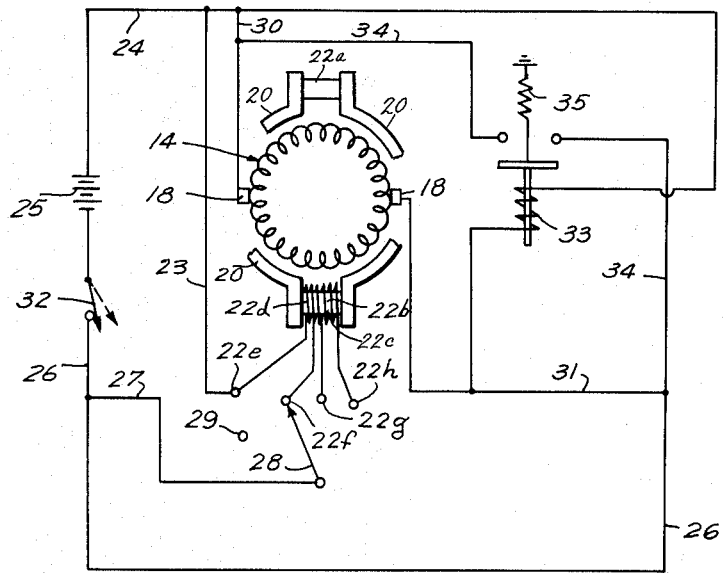
Figure 4:
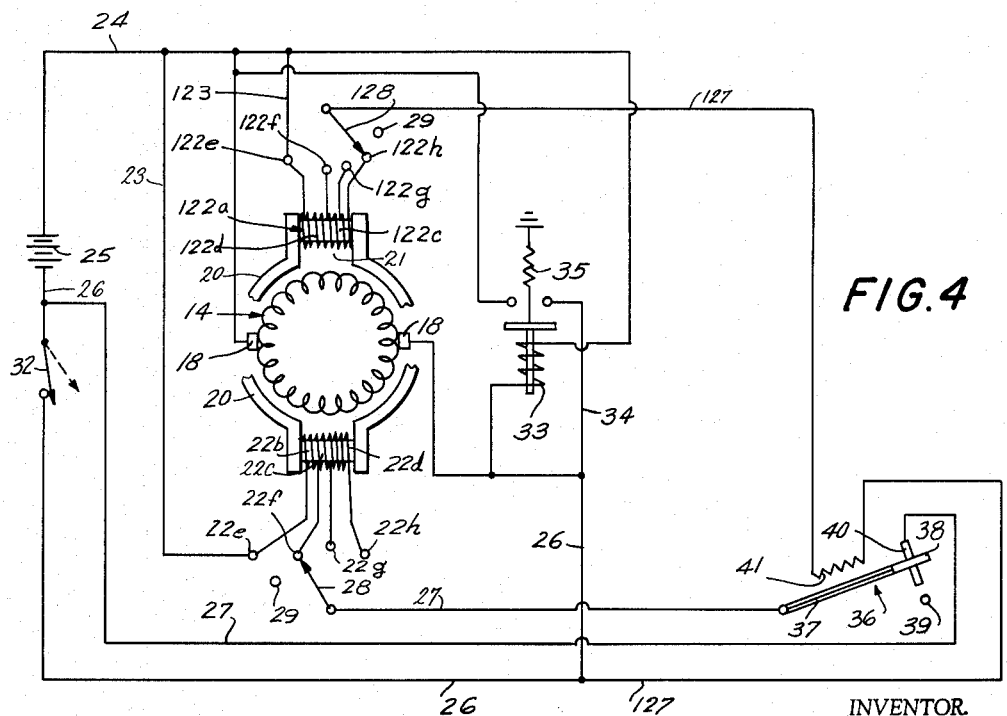

In the drawing, FIG. 1 is a side elevation, partly in section, of an electric motor embodying my invention;

FIG. 2 is a sectional view taken at line 2—2 of FIG. 1;

FIG. 3 diagrammatically illustrates the electrical connections for the electric motor shown in FIGS. 1 and 2; and FIG. 4 diagrammatically illustrates the electrical connections for a modification of the electric motor shown in FIGS. 1 and 2.

Referring to FIGS. 1 and 2, I have shown my invention in connection with an electric motor having a rotor 10 fixed to a shaft 11 which includes an armature 12 provided with a winding 14 having coils 14a connected to a commutator 15. The stator or stationary member of the motor includes a magnetic field frame 16 of annular form which is disposed between end heads or bells 17 in which the ends of the shaft 11 are journaled. Brushes 18 are supported in contact with the commutator 15 by brush holders 19 carried by one of the end heads 17.

In accordance with my invention, the motor is constructed so that the armature 12 can be rapidly braked and can be operated at different speeds. I do this by constructing the field frame 16 from a plurality of arcuate-shaped bodies 20 of magnetic material having gaps 21 therebetween and a plurality of magnets 22a and 22b which bridge the gaps between adjacent ends of the bodies, at least one of the magnets 22b being an electromagnet.

The bodies 20 of semi-circular form are provided with outwardly extending end flanges 20a between which the magnets 22a and 22b are fixed in any suitable manner to form the field frame. The magnet 22a is a permanent magnet and the magnet 22b is an electromagnet having a core 22c formed of magnetic material and a coil 22d. As diagrammatically shown in FIG. 3, a contact 22e is connected to one terminal of the coil 22d and a plurality of contacts 22f, 22g and 22h are connected to taps distributed along the coil, the tap for the contact 22h being at the opposite terminal of the coil.

The contact 22e is conected by conductors 23 and 24 to one terminal of a direct current source of electrical supply 25 and the opposite terminal thereof is connected by conductors 26 and 27 to a control arm 28 of a control, which is movable so that it can be connected to any one of the contacts 22f, 22g and 22h or to an "off" position against a stop 29 in which position the circuit for the electromagnet 22b is broken and it becomes de-energized. For the purpose of simplifying FIG. 3, the brushes 18 are diagrammatically shown in contact with the winding 14, one brush being connected by conductors 30 and 24 to one terminal of the source of electrical supply 25 and the other brush being connected by conductors 31 and 26 to the other terminal of the source of electrical supply.

When the control arm 28 is in its "off" position and the electromagnet 22b is de-energized and current is supplied to the armature winding 14 from the source of electrical supply 25 by closing a switch 32, motor action is started and the armature 12 that is loaded by the windshield wiper or a corresponding movable part will, if there is no appreciable resistance to the initial motion, revolve rapidly but with a weak torque in a weak magnetic field obtained by the permanent magnet 22a. In order to increase the torque of the armature 12 to overcome possibly existent resistance, the movable control arm 28 can be connected with the contact 22f to energize the electromagnet 22b, whereby the magnetic field in which the armature 12 revolves is obtained by the permanent magnet 22a and electromagnet 22b which have unidirectional polarity and are poled for operation in the same direction. By moving the control arm 28 so that it is connected with the contact 22g or 22h, the strength the total magnetic flux produced in the stator can be changed to vary the speed of rotation of the armature 12.

It will now be understood that the coil 22d forms part of an electrical circuit adapted to be connected to the direct current source of electrical supply 25 by closing the switch 32, and the movable control arm 28 and contacts 22f, 22g, 22h and 29 with which it cooperates comprise control means in the circuit for independently controlling the energization of the coil 22d to vary the total magnetic flux produced in the stator.

The permanent magnet 22a can be effectively employed to brake the armature 12 when the motor is disconnected from the source of electrical supply 25 by opening the switch 32. In order to promote such braking of the armature 12, the armature winding 14 desirably is short-circuited when the switch 32 is opened. This may be accomplished by providing a normally closed relay 33 in a conductor 34 which is connected across the brushes 18. When switch 32 is closed to supply current to the armature winding 14, relay 33 will be energized and move from its normally closed position to an open position against the action of a spring 35 to open conductor 34. When the operation of the motor is stopped by opening switch 32 to terminate the supply of current to the armature winding 14 and to the coil 22d of the electromagnet 22b and to the coil of relay 33, the relay 33 will be de-energized and move to its normally closed position with the aid of the spring 35 to close the conductor 34 and short-circuit the armature winding 14. Under these conditions, the armature winding functions as a damping winding in the magnetic field obtained by the permanent magnet 22a, thereby effectively braking the armature 12.

In FIG. 4 I have diagrammatically illustrated the connections for a modification of the electric motor shown in FIGS. 1, 2 and 3 and just described. In FIG. 4, in which parts similar to those shown in FIG. 3 are referred to by the same reference numerals, an electromagnet 122a is employed in place of the permanent magnet 22a. The electromagnet 122a includes a core 122c formed of magnetic material and a coil 122d. A contact 122e is connected to one terminal of the coil 122d and a plurality of contacts 122f, 122g and 122h are connected to taps distributed along the coil, the tap for the contact 122e being at the opposite terminal of the coil. The contact 122e is connected by conductors 123 and 24 to one terminal of the electrical source of supply 25 and the opposite terminal thereof is connected by conductors 26 and 127 to a control arm 128 of a control which is movable so that it can be connected to any one of the contacts 122f, 122g and 122h.

When the control arm 28 is in its "off" position at the stop 29 and the electromagnet 22b is de-energized and the control arm 128 is connected to one of the contacts 122f, 122g and 122h and current is supplied to the armature winding 14 from the source of electrical supply 25 by closing the switch 32, the electromagnet 122a will be energized and motor action started with the armature 12 revolving in a magnetic field obtained by the electromagnet 122a. By moving the control arm 128 so that it is connected with a different one of the contacts 122f, 122g and 122h, the strength of the magnetic field can be changed to vary the torque and the speed of rotation of the armature 12.

In order to increase the torque developed by the armature 12, which is accompanied by a reduction in its speed of rotation, the control arm 28 can be moved from its "off" position at the stop 29 and connected with one of the contacts 22f, 22g and 22h to energize the electromagnet 22b, whereby the magnetic field in which the armature 12 revolves is obtained by the electromagnets 122a and 22b which have unidirectional polarity and are poled for operation in the same direction. By moving the control arm 28 so that it is connected with a different one of the contacts 22f, 22g and 22h, the strength of the magnetic field can be changed to vary the speed of rotation of the armature 12.

In FIG. 4 the electromagnet 22b can be employed to brake the armature 12 when the motor is disconnected from the source of electrical supply 25. This may be accomplished by a switch 36 in the conductor 27 connected to the control arm 28. The switch 36 comprises a thermal member in the form of a bimetallic arm 37 having a contact 38 at its outer end which is movable between an "open" position at a stop 39 and a "closed" position at which time the contact engages an elongated contact plate 40. The arm 37 is movable from its "open" position to its "closed" position responsive to heat generated by a resistance heater 41 connected in the conductor 127.

Let us assume that electromagnet 122a is energized and current is being supplied to the armature winding 14. Under these conditions the circuit for the electrical resistance 41 is completed and the latter will generate heat, whereby the bimetallic arm 37 will flex upward responsive to such generated heat and the contact 38 on the arm 37 will engage the contact plate 40. With switch 36 closed electromagnet 22b will be energized when the control arm 28 is moved so that it is connected with one of the contacts 22f, 22g and 22h. After the bimetallic arm 37 flexes upward and initially engages the elongated contact plate 40 it will continue to flex upward to a region above the bottom edge of the contact plate responsive to heat generated by the resistance element 41.

When the switch 32 is opened to stop the operation of the motor, the supply of current to the armature winding 14, the coil 122d of electromagnet 122a, the relay 33 and the resistance heater 41 is terminated. When the relay 33 is deenergized it moves to its normally closed position with the aid of the spring 35 and the armature winding 14 is short-circuited. Even after the resistance heater 41 becomes deenergized the contact 38 remains connected to the elongated contact plate 40 for an interval of time as the bimetallic arm 37 is cooled by ambient air and commences to move toward its "open" position at the stop 39. During this interval of time, which occurs after the electromagnet 122a is de-energized and the armature winding 14 is short-circuited, the armature winding functions as a damping winding in the magnetic field obtained by the electromagnet 22b, thereby effectively braking the armature 12. After the bimetallic arm 37 flexes downward a sufficient distance for the contact 38 to move off the contact plate 40, the circuit for the electromagnet 22a is opened and the latter becomes de-energized. It will now be understood that by delaying the de-energization of the electromagnet 22b after the electromagnet 122a is de-energized, the armature 12 will be effectively braked by the magnetic field obtained by the electromagnet 22b after the supply of current to the armature winding 14 is stopped.

In FIG. 4 the permanent magnet 22a in FIG. 3 is replaced by a first electromagnet 122a comprising a first core 122c having a first coil 122d, as explained above. The electromagnet 22b, which may be referred to as a second electromagnet, comprises a second core 22c having a second coil 22d. The first and second coils 122d and 22d, respectively, form parts of an electrical circuit adapted to be connected to the direct current source of supply 25 by the switch 32. The movable contact arm 28 and the contacts 22f, 22g, 22h and 29 with which it cooperates comprise first control means in the circuit for independently controlling the energization of the second coil 22d to vary the total magnetic flux produced in the stator. Further, the switch 36 having the bimetallic arm 37 and cooperating contacts 38 and 40 comprises second control means in the electrical circuit for delaying the de-energization of the second coil 22d after the electrical supply to the first coil 122d is interrupted by opening the switch 32.

Modifications of the embodiments of my invention I have described will occur to those skilled in the art, and as I desire my invention not to be limited to the particular arrangements set forth, I intend in the claims to cover all modifications thereof which do not depart from the spirit and scope of the invention.

I claim:

1. A direct current motor having a stator comprising a frame formed of magnetic material having at least two gaps, a first magnetic member bridging one of the gaps and a second magnetic member bridging the other of the gaps, said first and second magnetic members having unidirectional polarity and poled for operation in the same direction, said first magnetic member comprising a permanent magnet and said second magnetic member comprising an electromagnet having a core and a coil therefor, said coil forming part of an electrical circuit adapted to be connected to a direct current source of electrical supply, and control means in said circuit for independently controlling the energization of said coil to vary the total magnetic flux produced in said stator.

2. A direct current motor as set forth in claim 1 in which said control means comprises taps distributed along said coil and an element which is movable with respect to said taps and cooperates therewith.

3. A direct current motor having a stator comprising a frame formed of magnetic material having at least two gaps, a first magnetic member bridging one of the gaps and a second magnetic member bridging the other of the gaps, said first and second magnetic members having unidirectional polarity and poled for operation in the same direction, at least one of said magnetic members comprising an electromagnet having a core and a coil therefor, said coil forming part of an electrical circuit adapted to be connected to a direct current source of electrical supply, and control means in said circuit for independently controlling the energization of said coil to vary the total magnetic flux produced in said stator.

4. A direct current motor having a stator comprising a frame formed of magnetic material having at least two gaps, a first magnetic member bridging one of the gaps and a second magnetic member bridging the other of the gaps, said first and second magnetic members having unidirectional polarity and poled for operation in the same direction, said first magnetic member comprising a first electromagnet having a first core and a first coil therefor and said second magnetic member comprising a second electromagnet having a second core and a second coil therefor, said first and second coils forming parts of an electrical circuit adapted to be connected to a direct current source of electrical supply, first control means in said circuit for independently controlling the energization of said second coil to vary the total magnetic flux produced in said stator, and second control means in said circuit for delaying the de-energization of one of said coils after the electrical supply to the other of said coils is interrupted.

5. A direct current motor as set forth in claim 4 in which said second control means is operable to delay the de-energization of said second coil after the electrical supply to said first coil is interrupted.

References Cited by the Examiner

UNITED STATES PATENTS

| | | | |
|---|---|---|---|
| 2,364,603 | 12/44 | Coxon et al. | 318—379 |
| 2,446,446 | 8/48 | Wargin et al. | 310—155 |
| 2,513,226 | 6/60 | Wylie | 310—154 |

ORIS L. RADER, *Primary Examiner.*